United States Patent Office 3,463,851
Patented Aug. 26, 1969

3,463,851
INSECT CHEMOSTERILANTS DERIVED FROM BORON
Alexej B. Borkovec, Kensington, and Joseph A. Settepani, Ellicott City, Md., assignors to the United States of America as represented by the Secretary of Agriculture
No Drawing. Filed Nov. 23, 1966, Ser. No. 596,727
Int. Cl. A01n 9/00
U.S. Cl. 424—185    11 Claims

ABSTRACT OF THE DISCLOSURE

The insect chemosterilants of the present invention are boron derivatives and include trialkyl borates wherein the alkyl groups are straight or branch chain saturated aliphatic hydrocarbons containing from 1 to 6 carbon atoms, borane compound with trimethylamine, and 2,3-dihydro-2-phenyl-1H-1,3,2-benzodiazaborole.

---

A non-exclusive, irrevocable, royalty-free license in the invention herein described, throughout the world for all purposes of the United States Government, with the power to grant sublicenses for such purposes, is hereby granted to the Government of the United States of America.

This invention relates to the use of certain synthetic organic compounds containing boron for the control or eradication of insect populations by causing sexual sterility in the insect.

The eradication of the screw-worm fly (*Cochliomyia hominivorax* Coq.) from the Island of Curacao and from the Southeastern United States as well as the current efforts to eliminate this insect from Texas and neighboring states demonstrated conclusively that the induction of sterility in an insect population may lead to its decline and eventual disappearance. The sexual sterilization of the screw-worm has been hitherto accomplished by irradiating the pupae of the artificially reared insects with gamma rays.

The use of chemical compounds, referred to as chemosterilants, in the sterilization of insects presents considerable theoretical and practical advantages over the irradiation treatment.

First, natural populations of insects can be sterilized with chemicals by ingesting or otherwise absorbing the chemosterilant. Irradiation treatment of naturally occurring insects is not possible.

Second, artificially reared insects can be sterilized by adding suitable chemosterilants to their diet, dipping the insects in the solutions of chemosterilants, spraying the insects with the chemosterilant, or administering the sterilant in any other convenient manner. The radiation treatment, even if it as effective as the chemosterilant, has to be performed in complex installations which can provide a source of high energy radiation.

Third, the large variety of potential chemosterilants presents a much more flexible tool for the induction of sterility as compared to gamma rays. It has been demonstrated that certain insects cannot be successfully sterilized by the radiation treatment whereas they can be sterilized by suitable chemosterilants.

According to the present invention sexual sterility of insects is obtained by contacting the insect with a boron-containing compound such as a trialkyl borate wherein the alkyl groups are straight or branched short carbon chain saturated aliphatic hydrocarbons, preferably containing from 1 to 6 carbon atoms; borane compound with trimethylamine; and 2,3 - dihydro - 2 - phenyl - 1H-1,3,2-benzodiazaborole.

The trialkyl borates are represented by the structural Formula I wherein the alkyl groups exemplified are shown following Ia to Ie:

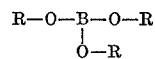

Ia; R=CH₃
Ib; R=C₂H₅
Ic; R=CH₂CH₂CH₂CH₃
Id; R=CH₂CH(BH₃)(CH₃)
Ie; R=CH₂(CH₂)₄CH₃ and the nitrogen-containing boron compounds are represented by the following structural formulas:

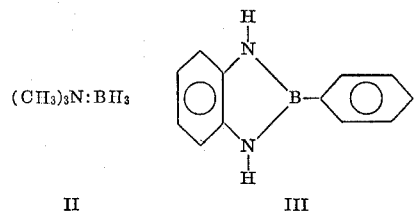

(CH₃)₃N:BH₃

II    III

The compound of Formula II is described in the literature as borane compound with trimethylamine, and III is 2,3-dihydro-2-phenyl-1H-1,3,2-benzodiazaborole. These nitrogen-containing boron compounds are representatives of two different classes of compounds, wherein in each class, the substitution of one or more short carbon chain alkyl groups for an active hydrogen may provide chemosterilant active compounds.

The compounds of the present invention act as chemosterilants, i.e., they prevent or reduce reproduction of insects, by suppressing oviposition, by reducing or eliminating hatch of eggs, or by causing death of larvae which hatch from eggs laid by insects contacted by the compounds.

Various means of contacting the insects with the boron derivatives may be employed. The compounds of the present invention are effective as food additives, as residual coatings which the insects touch, and by direct topical application to the insect body.

The effectiveness of the boron-containing compounds as chemosterilants is exemplified with the genera Musca and Cochliomyia, and these chemosterilants are considered to have broad application to many genera and orders of insects in controlling insect population.

The invention is illustrated, but is not intended to be limited by, the following examples:

Example I

One hundred freshly emerged adult house flies of both sexes were fed in a cage a diet consisting of 1% trimethyl borate (Ia) and 99% of fly food (6 parts of sugar, 6 parts of powdered nonfat dried milk, and 1 part of powdered egg yolk). After 3 days, the remaining treated food was replaced with untreated fly food. In a separate control experiment the same number of flies was kept on untreated fly food only. When the flies were 6–7 days old, a cup with 1.5 cm. of moist CSMA (Chemical Specialties Manufacturers Association) larval medium was placed in each cage for oviposition. Six hours later the cups were filled with water and the egg masses were broken up by stirring. It was apparent that the treated flies produced a considerably smaller number of eggs than the control flies. A random sample of 100 eggs was collected from each cup; the eggs were laid on a piece of moist cloth which was laid on top of a moist larval medium in a rearing container. Out of the 100 control eggs 99% hatched within 3 days; 26% of the eggs laid by treated flies hatched in the same period. The larvae crawled into the rearing medium and after 7 days the number of pupae in the medium was determined. The control produced 90 pupae whereas the treated sample produced only 1 pupa. The mortality of the treated flies was about the same as that of the control flies.

Similar experiments were carried out with compounds Ib, Ic, Id, Ie, II, and III The results are given in Table I.

TABLE I.—EFFECT OF ORALLY ADMINISTERED BORON CONTAINING CHEMOSTERILANTS ON REPRODUCTION OF HOUSE FLIES

| Compound | Hatch, percent | Pupation, percent | Reproduction control, percent |
|---|---|---|---|
| Ia | 26 | 1 | 99 |
| Ib | 88 | 41 | 59 |
| Ic | 90 | 62 | 38 |
| Id | 85 | 49 | 51 |
| Ie | 80 | 75 | 25 |
| II | 90 | 78 | 22 |
| III | 0 | 0 | 100 |

Example II

Seventy-five adult screw-worm flies of both sexes, less than 1 day old, were fed sugar sirup containing 1% of trimethyl borate (Ia) for 5 days. In a separate control experiment the same number of flies was fed sugar sirup only. When the flies were 13–14 days old they were allowed to oviposit and the percentage of egg hatch was determined. The hatch of the eggs laid by the control flies was 90%. None of the eggs laid by the treated flies hatched (0% hatch). The mortality of the treated flies by the end of the experiment was 69%. The mortality of the controls was 10%.

Similar experiments were carried out with compounds Ib, Ic, Id, Ie, II, and III. The results are summarized in Table II.

As apparent from Table I, 2,3-dihydro-2-phenyl-1H-1,3,2-benzodiazaborole and trimethyl borate were the most effective in preventing reproduction of houseflies. Trimethyl borate, triethyl borate, tributyl borate and borane compound with trimethylamine were all 100% effective chemosterilants for screw-worm flies. All of the compounds of the present invention exhibited insect chemosterilant activity.

TABLE II.—EFFECT OF ORALLY ADMINISTERED BORON CONTAINING CHEMOSTERILANTS ON REPRODUCTION OF SCREW-WORM FLIES

| Compound | Oviposition | Hatch, percent | Mortality, percent | Reproduction control, percent |
|---|---|---|---|---|
| Ia | Reduced | 0 | 69 | 100 |
| Ib | do | 0 | 61 | 100 |
| Ic | Normal | <50 | 44 | >50 |
| Id | Reduced | 0 | 40 | 100 |
| Ie | Normal | <50 | 32 | >50 |
| II | None | 0 | 76 | 100 |
| III | Normal | <50 | 24 | >50 |

We claim:
1. A method of causing sexual sterility of insects of the genera Musca and Cochliomyia which comprises feeding insects of said genera a diet containing about 1% of a boron compound selected from the group consisting of:
   (a) $B(OR)_3$, wherein R is alkyl selected from the group consisting of straight and branched chain saturated aliphatic hydrocarbons having from 1 to 6 carbon atoms;
   (b) $(CH_3)_3N:BH_3$; and
   (c) 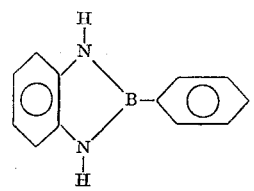

2. The method of claim 1 in which the insect is the housefly.
3. The method of claim 2 in which the boron-containing compound is 2,3-dihydro-2-phenyl-1H-1,3,2-benzodiazaborole.
4. The method of claim 2 in which the boron-containing compound is trimethyl borate.
5. The method of claim 2 in which the boron-containing compound is triethyl borate.
6. The method of claim 2 in which the boron-containing compound is triisobutyl borate.
7. The method of claim 1 in which the insect is the screw-worm fly.
8. The method of claim 7 in which the boron-containing compound is trimethyl borate.
9. The method of claim 7 in wich the boron-containing compound is triethyl borate.
10. The method of claim 7 in which the boron-containing compound is triisobutyl borate.
11. The method of claim 7 in which the boron-containing compound is $(CH_3)_3N:BH_3$.

References Cited

King: Chemicals Evaluated as Insecticides and Repellents at Orlando, Fla., U.S. Department of Agriculture, Agriculture Handbook No. 69, May 1954, pages 1–12 and 89.

ALBERT T. MEYERS, Primary Examiner

JEROME D. GOLDBERG, Assistant Examiner